United States Patent [19]
Livingston

[11] Patent Number: 6,145,784
[45] Date of Patent: *Nov. 14, 2000

[54] SHARED APERTURE DICHROIC ACTIVE TRACKER WITH BACKGROUND SUBTRACTION

[75] Inventor: Peter M. Livingston, Rancho Palos Verdes, Calif.

[73] Assignee: TRW Inc., Redondo Beach, Calif.

[*] Notice: This patent is subject to a terminal disclaimer.

[21] Appl. No.: 08/991,061

[22] Filed: Dec. 15, 1997

Related U.S. Application Data

[63] Continuation-in-part of application No. 08/919,413, Aug. 27, 1997, Pat. No. 6,021,975.

[51] Int. Cl.$^7$ ........................................ F41G 7/00
[52] U.S. Cl. .................. 244/3.11; 244/3.16; 89/41.06
[58] Field of Search ..................... 244/3.13, 3.11, 244/3.16; 250/203.2; 356/141.1; 89/41.06, 41.19, 41.21, 1.11

[56] References Cited

U.S. PATENT DOCUMENTS

| | | | |
|---|---|---|---|
| H341 | 10/1987 | Mongeon | 250/203.2 |
| 4,009,393 | 2/1977 | Ashley, Jr. et al. | 244/3.16 |
| 4,047,816 | 9/1977 | Pell et al. | 250/203.2 |
| 4,347,996 | 9/1982 | Grosso | 244/3.16 |
| 4,349,838 | 9/1982 | Daniel | 244/3.13 |
| 4,386,848 | 6/1983 | Clendenin et al. | 244/3.13 |
| 4,558,836 | 12/1985 | Kriegesmann | 244/3.11 |
| 4,562,769 | 1/1986 | Heynau et al. | 89/41.06 |
| 4,676,455 | 6/1987 | Diehl et al. | 244/3.13 |
| 5,198,607 | 3/1993 | Livingston et al. | |
| 5,253,033 | 10/1993 | Lipchak et al. | 250/203.2 |
| 5,268,691 | 12/1993 | Murphy | 244/3.13 |
| 5,345,304 | 9/1994 | Allen | 250/203.2 |
| 5,528,354 | 6/1996 | Uwira | 250/203.2 |
| 5,600,434 | 2/1997 | Warm et al. | 250/203.2 |
| 5,747,720 | 5/1998 | Schnurr et al. | 89/1.11 |
| 5,878,977 | 3/1999 | Hosaka et al. | 244/3.13 |
| 5,900,620 | 5/1999 | Livingston | 250/203.2 |

OTHER PUBLICATIONS

"Boresighting a Gaussian Beam on a Specular Target Point: A Method Using Conical Scan," Erteza, Ahmed, *Applied Optics*, vol. 15, 1976 pp. 656–660.

"Laser Beam Active Tracking for Specular Objects to Fractions of λ/D" Livingston, Peter, M., Jacoby, Jerold L., and Tierney, William S., *Applied Optics*, vol. 24, 1985 pp. 1919–1925.

"Flexure–Beam Micromirror Spatial Light Modulator Devices For Acquisition, Tracking, and Pointing" Rhoadarmer, Troy A., Gustafson, Steven C., Little, Gordon R. and Lin, Tsen–Hwang, *SPIE*, vol. 2221 1994 pp. 418–430.

*Primary Examiner*—Charles T. Jordan
*Assistant Examiner*—Denise J Buckley
*Attorney, Agent, or Firm*—Michael S. Yatsko

[57] ABSTRACT

An imaging self-referencing target tracker (10) for a laser weapon (12). The weapon generates a first beam of radiation (14) that engages a target (16) to form a beam hit spot (20) thereon. In a first embodiment, a target illuminator (22) (variant 1) illuminates the target with a second beam of radiation (23a). An optics subsystem (30) receives and separately images the first and second beams (23b, 24) of radiation. In a second embodiment, a blocking filter (40) is implemented rather than an illumination laser to pass only radiation at the target wavelength, thereby ensuring that the first and second beams of radiation are separately imaged. A controller (32) is programmed to steer the first and second beams of radiation to the desired target aim point (18) in response to information from the imaged first and second beams of radiation. The tracker of the present invention tracks the laser hit spot relative to the actual target image in a closed loop manner, thereby increasing the probability of accurate target engagement and resulting in a target kill.

8 Claims, 5 Drawing Sheets

SHARED APERTURE DICHROIC ACTIVE TRACKER WITH BACKGROUND SUBTRACTION

CROSS REFERENCE TO RELATED APPLICATIONS

The present application is a continuation-in-part of application Ser. No. 08/919,413, now U.S. Pat. No. 6,021,975, filed on Aug. 27, 1997 entitled Dichroic Active Tracker. The present application contains subject matter in common with U.S. patent application Ser. No. 08/919,080, now U.S. Pat. No. 5,918,305, filed on Aug. 27, 1997 entitled "Imaging Self-Referencing Tracking System and Associated Methodology", and U.S. patent application Ser. No. 08/920, 538, now U.S. Pat. No. 5,900,620, filed on Aug. 27, 1997 entitled "Magic Mirror Hot Spot Tracker", both of which are assigned to TRW, Inc., assignee of the present invention.

BACKGROUND OF THE INVENTION

1. Technical Field

The present invention relates generally to systems for tracking moving objects in conjunction with a laser beam and, in particular, to a self-referencing, imaging tracker that separately images target and target laser hit spot radiation to directly reference the laser hit spot relative to the target in a common coordinate system, thereby allowing the laser weapon to be locked onto, and maintained at, a desired target aim point until a target kill is achieved.

2. Discussion

Image trackers are often used in conjunction with lasers or other weaponry to disable inflight missiles. Conventional image trackers presently employ only non-self-referencing schemes for directing a laser beam to a desired target aimpoint. In practice, this means that the laser beam direction in space is inferred from the tracker line of sight as the tracker tracks the missile.

Trackers using imaging, non-self-referencing techniques typically utilize one or more imaging devices, such as electronic cameras, that first determine an approximate, or wide field of view (WFOV) position, and then an instantaneous, or narrow field of view (NFOV), position of a targeted object. After capturing the target image in the NFOV's track gate, the tracker, under servo-loop control, follows the target. In most instances, the tracker is physically mounted on gimbals in a beam pointer. Therefore, the pointer line-of-sight also tracks the target if the pointer and tracker are properly boresighted.

Although conventional imaging, non-self-referencing trackers often provide adequate target location functions, a number of limitations exist with such systems. For example, in medium wave forward looking infrared (FLIR) based trackers, the laser weapon used for target engagement often interferes with the tracker imaging system, as instantaneous non-specular return from the laser hit spot on the object often blinds the camera, or, at least causes the camera automatic gain control to reduce camera gain to accommodate the bright laser hit spot, thereby losing all target image information. Typically, the laser-reflected power is some 40 to 60 dB greater than the target thermal signature. Additionally, with regard to long wave FLIR based systems, bright thermal energy from heated war heads may also blind such systems, causing the systems to lose track of the targeted object.

Solutions to the above problems include programming the system to select a laser aim point outside of the narrow field of view (NFOV) or the use of short wave infrared (SWIR) track bands with active illumination, causing the laser return to be invisible to the NFOV SWIR camera. If the laser aim point is selected outside of the view of NFOV however, the laser beam pointing must be determined by feed forward estimation. Such an end point selection is undesirable, as it eliminates missile nose-kill possibilities, and is subject to estimation noise as explained earlier. Alternatively, if a short range IR track band is used, the laser beam pointing must also be done via feed forward estimation. Such a scheme increases the susceptibility of the tracker to atmospheric disturbances.

Additionally, with non-self-referencing imaging trackers, the tracker line-of-sight must be accurately boresighted with the laser weapon line of sight. Due to the design of such systems, it has been found difficult to maintain an accurate bore sight under adverse environmental conditions.

Self-referencing trackers solve the above described limitations of the conventional imaging, non-self-referencing trackers by referencing the laser beam instantaneous position to the target image itself rather than to the tracker line-of-sight direction. Also, self-referencing trackers have lines-of-sight that need not be coaxial with the laser weapon, thereby subsequently minimizing the weight on the system gimbals and simplifying system transmit optics.

Presently, non-imaging self-referencing trackers, such as the systems disclosed in pending U.S. patent application Ser. No. 08/631,645, now U.S. Pat. No. 5,780,838, entitled "Laser Crossbody Tracking System and Method", now U.S. Pat. No. 5,780,838, and U.S. patent application Ser. No. 08/760,434, now U.S. Pat. No. 5,780,839, entitled "Laser Crossbody and Feature Curvature Tracker", now U.S. Pat. No. 5,780,839, both incorporated herein by reference, are known in the art.

Non-imaging self-referencing trackers are presently deployed as vernier trackers; that is, the trackers correct residual image jitter created by imperfect image tracker performance. Thus, the non-imaging tracker bears the major tracking burden for difficult targets, such as small artillery rounds or maneuvering cruise missiles. Non-imaging self-referencing trackers use the laser beam itself to seek and hold onto a glint, such as a cylindrical missile roll axis. Therefore, the laser beam positioning on the target becomes independent of tracker jitter in the jitter direction and within the non-imaging tracker track bandwidth.

Although non-imaging self-referencing systems provide certain advantages over imaging, non-self-referencing systems, there is still room for improvement in the art. For example, there is a need for an imaging, self-referencing laser beam tracker that can be locked onto a desired target aim point, whether or not a glint is present at that point, and held on the aim point at will. In addition, there is a need for an imaging, self-referencing tracker that provides maximum noise immunity from atmospheric optical turbulence through measurement of the laser beam position relative to the position of the target through the same atmospheric path. There is also a need for an imaging, self-referencing tracker that reduces or eliminates the pointing error associated with the estimated aimpoint offset associated with conventional open loop trackers by measuring an actual laser hit spot location on the target relative to the target itself.

In copending application Ser. No. 08/919,413, pending filed on Aug. 27, 1997, entitled Dichroic Active Tracker, a dichroic beam splitter is used to separate the near IR range radiation reflected from the target from the mid IR range radiation reflected from the high energy laser (HEL) to image the target and the target hit spot on separate detector arrays. Both the near IR range and mid IR range radiation reflected from the target are received over a common optical path. Unfortunately, there is about a 50–60 dB difference in the near IR radiation reflected from the target and the mid IR radiation associated with the HEL which can cause diffuse scattering of the reflected radiation which can result in saturation of the detector arrays possibly causing errors in the servo loop which locks the HEL on the hit spot on the target.

SUMMARY OF THE INVENTION

Accordingly, the tracker of the present invention provides target aim point selection and calculation of the track-point offset via a high power laser beam closed loop tracking system. There are two variants of the present invention; In variant 1, a pulsed near-infrared band illuminator laser, mounted near the tracker, illuminates the missile body, enhancing its image, as received by the tracker. In the tracker are two detector arrays; one sensitive to the near-IR radiation associated with the illuminator, but insensitive to the mid-IR radiation associated with the laser, and a second array sensitive to the mid-IR band but not the near-IR band in which the target image is determined. In the second variant, the mid-IR band is divided into two sub-bands; one containing all the laser lines, and one extending to the band limit determined by atmospheric absorption. Typically the bands are: (a) laser: 3–4 $\mu$m and; (b) target image; 4–4.5 $\mu$m. These sub-bands are created by a blocking filter that is placed in the target image optical path. The image and laser hit spot from either variant are co-registered by optics choice and physical constraints placed on the detector arrays, then target and hit-spot centroid information refer to a common coordinate system from which the laser hit centroid vector distance to the image centroid is readily determined. The desired laser aimpoint may also be transcribed into that same coordinate system, therefore a servo-loop arrangement sensitive to the vector difference between the laser hit-spot and the laser aimpoint activates, driving the laser hit spot to the assigned laser aimpoint.

More particularly, variant 1 of the present invention provides a target tracker that includes a target illuminator that illuminates the target with radiation of a first wavelength. A laser weapon generates a laser beam comprised of radiation having a second wavelength. The laser beam engages the target and forms a laser beam hit spot thereon. An optics subsystem receives and detects both the illuminated target and the hit spot. A controller is programmed to steer the laser beam in response to the detected target and hit spot locations.

Variant 2 of the present invention provides a target tracker that includes an optics subsystem that separately images target radiation and laser hit spot radiation. A blocking filter incorporated into the optics subsystem ensures that only radiation at the target radiation wavelength passes to the first detector, while only radiation at the target hit spot wavelength passes to a second detector. The blocking filter obviates the need for the target illuminator utilized in variant 1. A controller then steers the laser beam generated by the laser weapon in response to the detected target and target hit spot locations.

In addition, the present invention provides a method of tracking a target. The method includes the steps of selecting an aim point on a target; illuminating the target with radiation having a first wavelength; engaging the target with a laser beam of a second wavelength to form a laser beam hit spot on the target; simultaneously imaging the illuminated target and the laser beam hit spot; and steering the laser beam to a target aim point based on a calculated difference between the target aim point and the laser beam hit spot.

In an alternate embodiment of the invention, a shared aperture is used for the outgoing high energy laser (HEL) and the incoming reflected radiation from the target by way of a telescope optics arrangement. A sapphire shared aperture arrangement is used to take advantage of the annular occlusion in the outgoing HEL beam. In particular, a hole in the shared aperture element, corresponding to the annular occlusion region in the HEL beam, transmits near IR range radiation from the target and reflects mid IR range radiation associated with the HEL beam. Since the millimeter wave infrared reflectance-coated sapphire transmits near IR range and reflects mid IR range radiation, the target detector is insensitive to mid IR radiation scattered from the target while the scattered light in the mid IR range is reflected to a mid IR range detector for imaging the laser hit spot on the target. In order to prevent the diffuse scatter from affecting the mid IR range imaging detector, the reflected radiation in the mid IR range is directed to a tilt mirror and, in turn, reflected to the laser spot detector array. Depending on the angular position of the mirror, the tilt mirror images radiation from the laser hit spot on the target or from the background. By periodically sampling the background radiation, the background radiation can be subtracted from the mid-IR radiation in order to improve the signal to noise ratio of the signal. The target and laser hit spot detector arrays are co-registered to enable the laser to be locked onto an aimpoint on the target by closed loop control.

DETAILED DESCRIPTION OF THE PREFERRED EMBODIMENTS

Figure 1A:
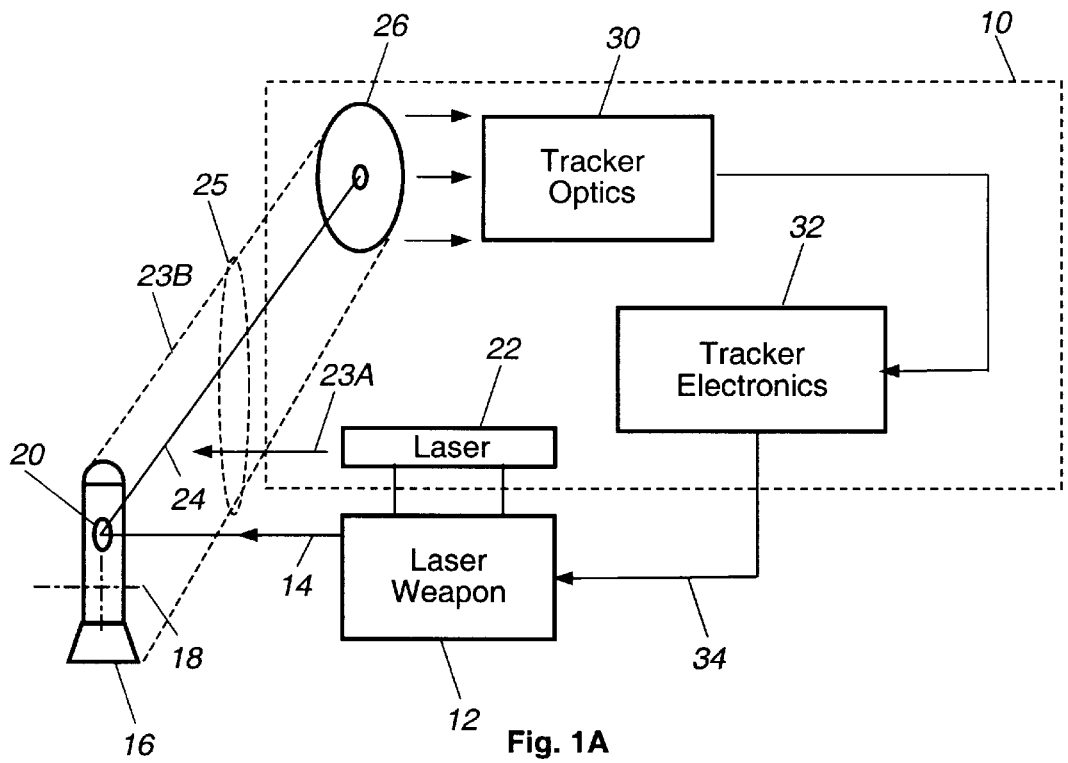
FIG. 1A is a block diagram illustrating the tracker according to a preferred embodiment of the present invention.

Referring to FIG. 1A, a missile tracker according to a first preferred embodiment of the present invention is shown generally at 10. The tracker is implemented in conjunction with a laser weapon 12 to steer a laser beam 14, produced by the laser weapon, into engagement with a target, such as the missile shown at 16. The tracker functions first to lock the target in its field-of-view, then to drive the difference between the desired target aim point, indicated by the cross hairs at 18, and an actual laser beam target engagement point, referred to as the laser beam hit spot 20, to zero, thereby increasing the probability of a target kill.

Figure 6:
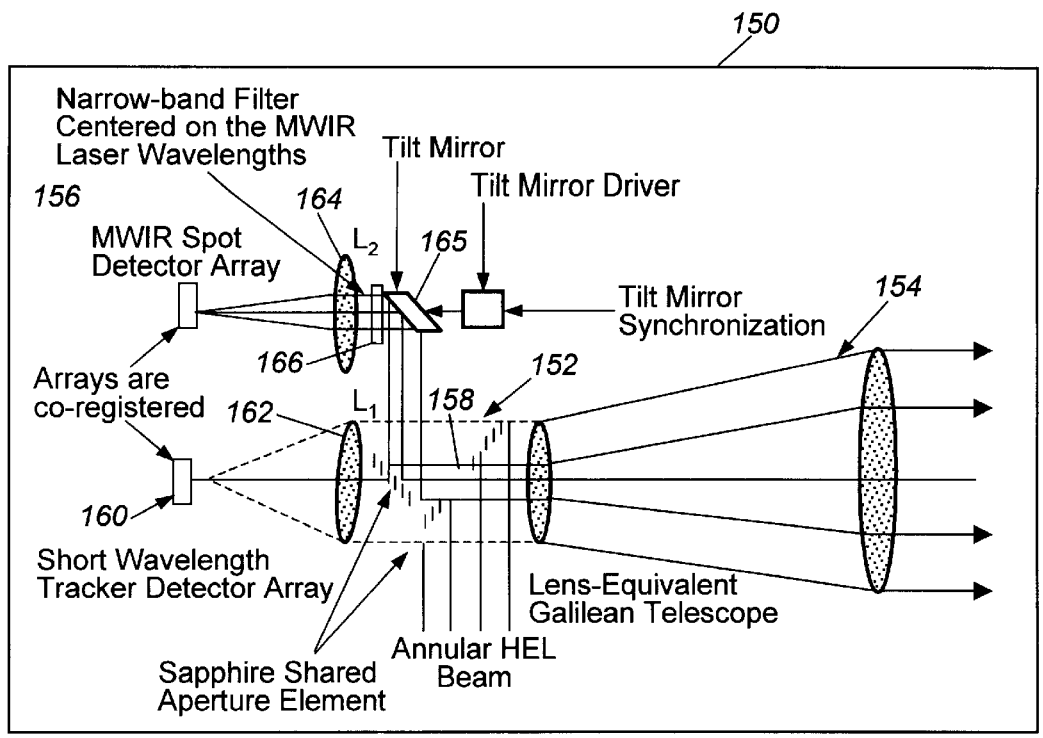
FIG. 6 is a block diagram of an alternative optical system for use with tracker according to an alternative embodiment of the invention.
Figure 7:
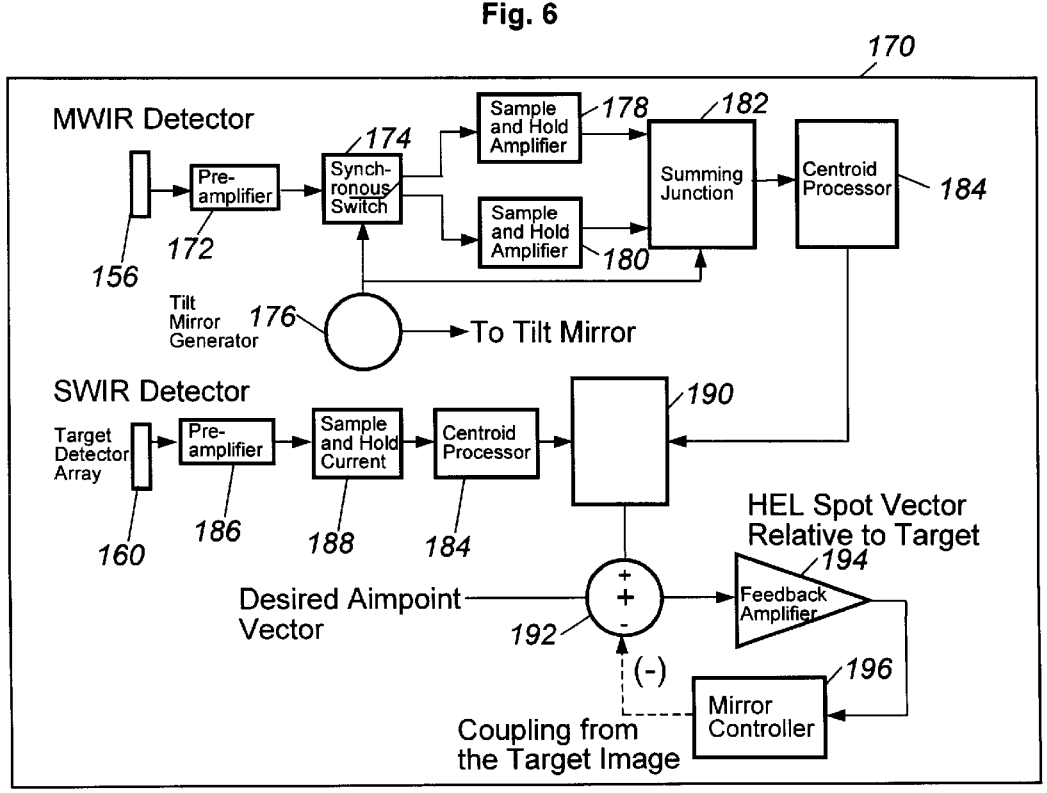
FIG. 7 is a block diagram of an optical processing system for use with the alternative processing system illustrated in FIG. 6.

As will now be described, the tracker of the present invention images both the missile 16 and the laser beam hit spot 20 in a manner that minimizes loss of missile information using one of two possible implementations which will be referenced throughout as variant 1 and variant 2. FIGS. 6 and 7 illustrate an alternative embodiment of the invention which utilizes a shared aperture for the outgoing mid IR range radiation of the laser beam 14 and the near IR range indication reflected from the target 16.

In variant 1, as shown in FIG. 1A, the system includes an illuminator laser 22 that preferably operates in the near infrared band. The laser 22 illuminates the missile 16 with a series of short pulses of light 23a. The illuminator laser 22 creates an enhanced image of the missile 16 contained in the reflected radiation 23a, that includes minimal background interference because of its short pulse length image gating. The reflected radiation 23b, in combination with radiation 24 reflected from the target hit spot 20, form an input beam of radiation, indicated generally at 25.

Still referring to FIG. 1A, the input radiation 25 is incident upon receiver optics 26. The radiation from the missile contained in the incident radiation may be, for example, 1.54 microns, while the radiation from the laser may be, for example, 3.80 microns. However, these wavelengths are arbitrary as long as the tracker imagers, discussed below, image only radiation from specific predetermined wavelengths. The radiation 25 passes to tracker optics 30, which separates the radiation from the missile 16 and from the laser beam hit spot 20 in a manner that is described in more detail below. The tracker optics 30 generate an electrical output that is fed into tracker electronics 32. Tracker electronics, enabled only during the pulsing of the laser, process the signal information from the tracker optics 30 and correspondingly output beam steering commands 34 to the laser weapon 12.

Figure 2A:
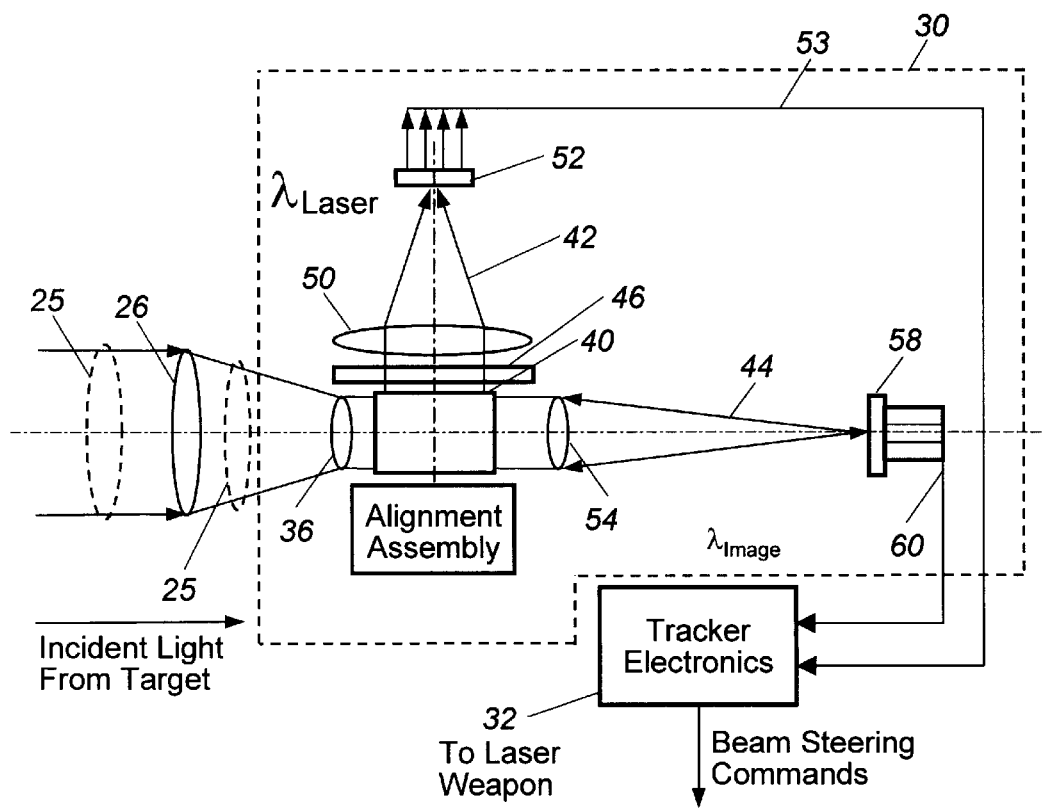
FIG. 2A illustrates the components of the optical subsystem of the first preferred embodiment shown in FIG. 1A in more detail.

FIG. 2A illustrates the tracker optics 30 in greater detail. The input radiation 25 is focused through input optics onto a recollimating lens 36. The recollimating lens 36 passes the collimated input beam onto a dichroic beam splitter 40. The dichroic beam splitter 40 splits the collimated input beam of radiation 25 into a first beam of radiation 42 and a second beam of radiation 44. The first beam of radiation is passed through a band pass filter 46 that permits radiation only at the wavelength of the laser beam 14 to pass. The filtered radiation then passes through a detector imaging lens 50 that focuses the radiation onto a focal plane detector array 52. Preferably, the focal plane detector array 52 is a charge coupled device (CCD) array of detectors, with each detector in the array being proportionally sensitive to all radiation incident thereon. The detector array 52 preferably includes an associated gain that is adjusted according to the level of the first beam of radiation.

Still referring to FIG. 2A, the second beam of radiation 44 is output from the beam splitter 40 through secondary focusing lens 54. The secondary focusing lens 54 focuses the beam onto a second detector array 58, which is of a type similar to the array 52. The array 58 outputs electrical signals 60 corresponding to the signal level of the beam of all radiation 44 incident thereon.

Figure 1B:
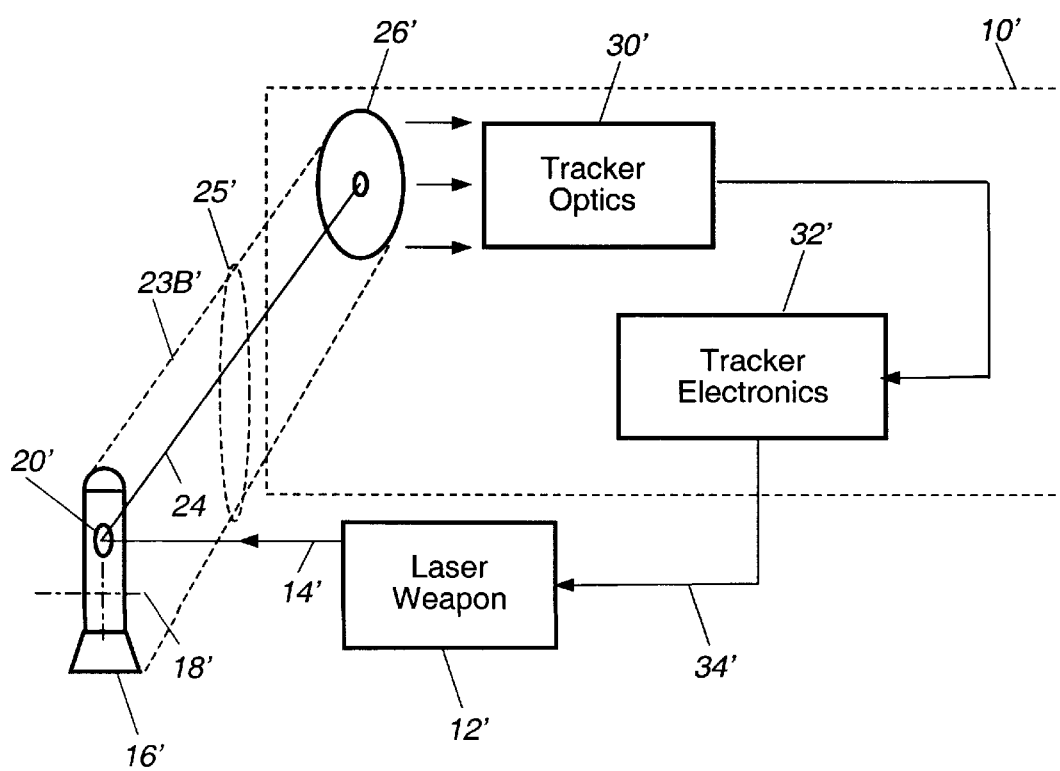
FIG. 1B is a block diagram illustrating the tracker according to a second preferred embodiment of the present invention.
Figure 2B:
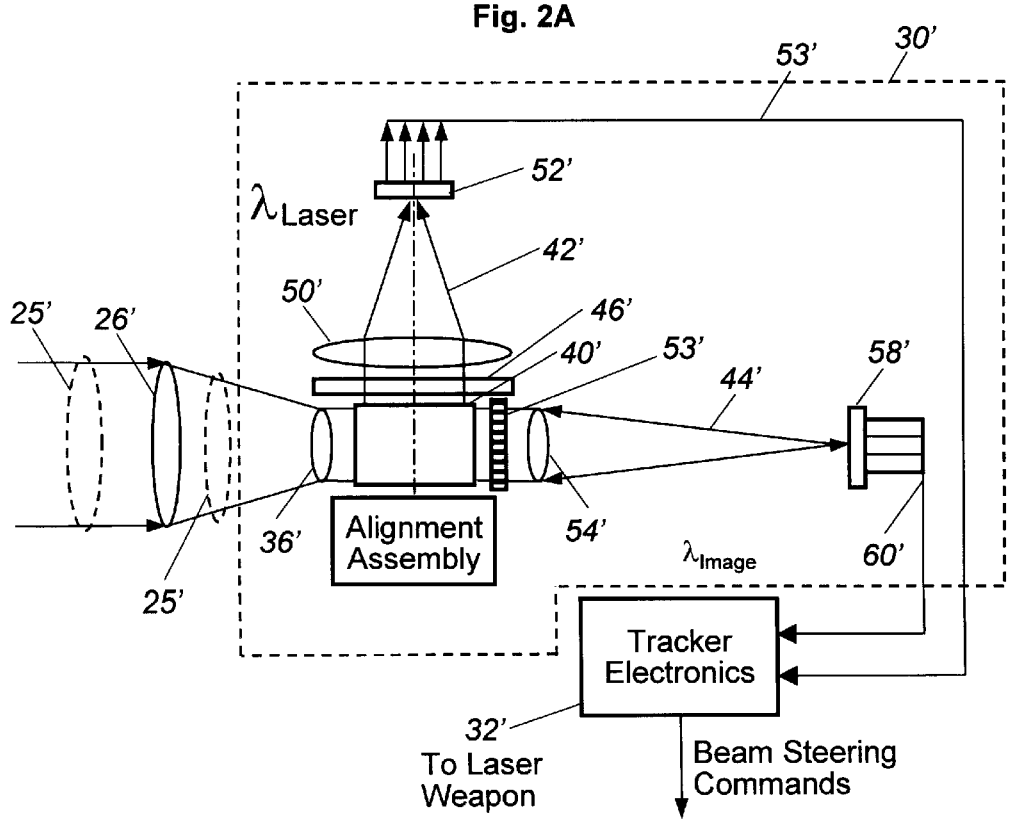
FIG. 2B illustrates the components of the optical subsystem of the second preferred embodiment shown in FIG. 1B in more detail.

Referring to FIG. 1B, a missile tracker according to a second preferred embodiment of the present invention, variant 2, is shown generally at 10'. The tracker 10' includes components that are identical to those in the tracker 10 shown in FIG. 1A, and operates in a manner similar to the tracker 10. However, the tracker 10' does not include an illuminator laser. Rather, as shown in FIG. 2B, the tracker optics subsystem 30' utilizes a blocking filter 53' between the beam splitter 40' and the secondary focusing lens 54' to pass radiation only at the wavelength of the target radiation 23b'. In addition, the detector array 52' is of the same type as the detector array 58'. Thus, although the target 16' may not be illuminated as brightly as the target 16 shown in FIG. 1A, and thus the target radiation 23b' may not have a luminous intensity like that of the target radiation 23b resulting from radiation 23a being reflected from the target 16, variant 2 eliminates the need for the illuminator laser 22.

Referring to both FIGS. 2A and 2B, an alignment assembly of the type that is commercially available, such as an autocollimator, maintains co-registration of arrays 52 and 58, so that the images may be referenced identically with respect to one another in a common coordinate system. As the individual images are generated, a difference vector between the laser beam hit spot and the desired target aim point can thus be computed with respect to the common coordinate system. Tracker electronics are programmed by conventional programming techniques to drive this vector difference to zero. The laser beam is then servo controlled to the desired target aim point and held there for target engagement purposes.

It should be appreciated that the input optics associated with the tracker of the present invention are designed so that both the target and laser beam image can be captured in the system's field of view and successfully processed by the tracker of the present invention. Thus, the input optics 36 must be reflective or include dichroic refractive elements.

Figure 3:
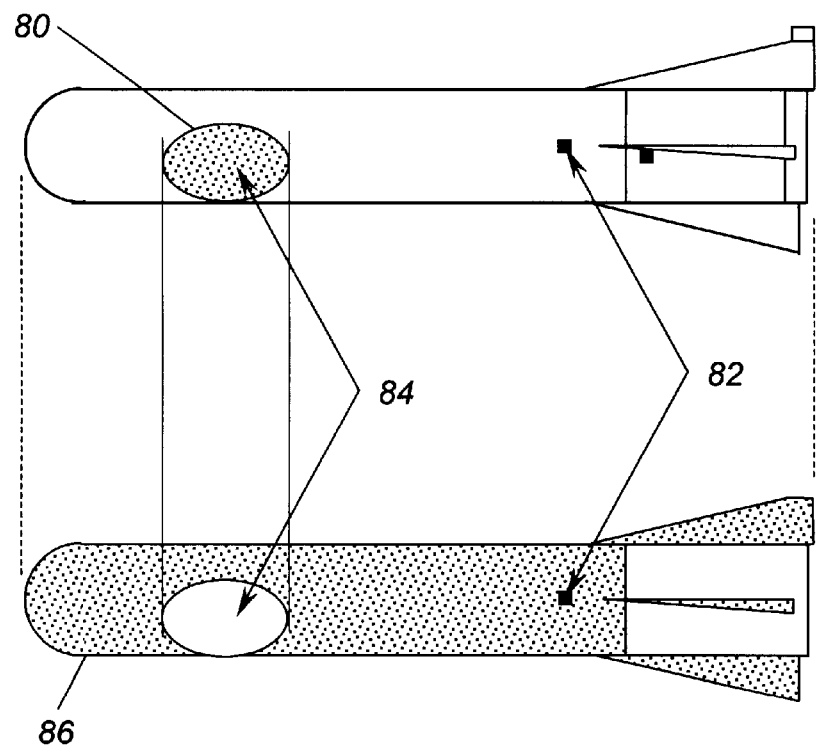
FIGS. 3 and 4 illustrate images detected by the detector arrays of the optical subsystem shown in FIGS. 2A–2B.
Figure 4:
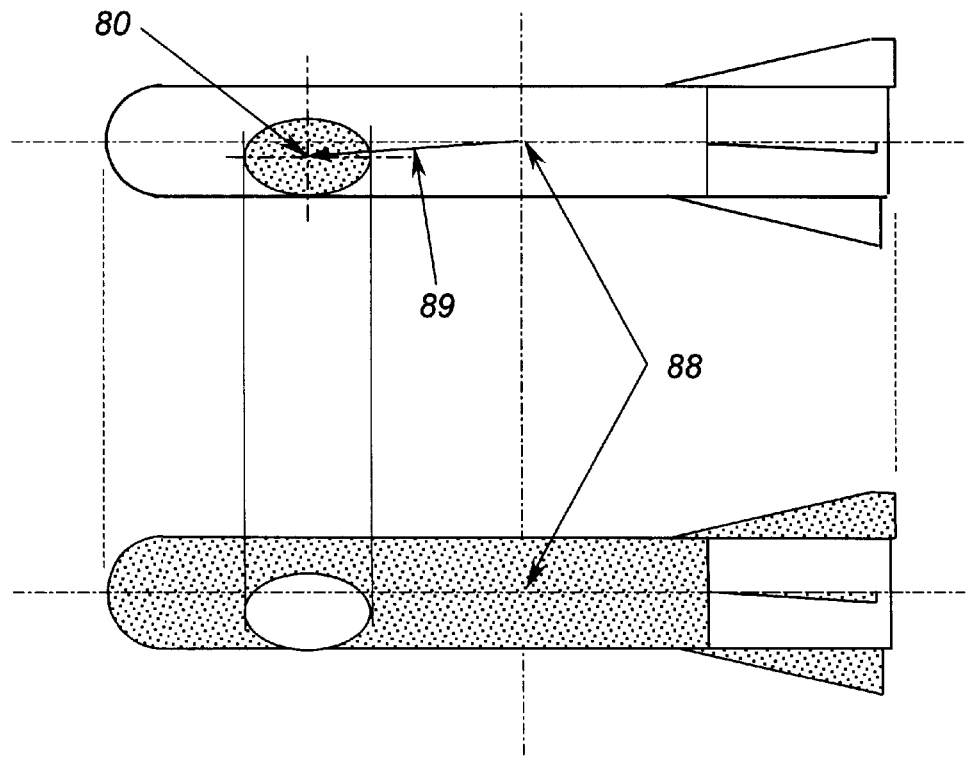

Referring to FIGS. 3 and 4, coregistration of electrical signals generated by the detector arrays 52, 58 for both variant 1 and variant 2, will now be described. As shown in FIG. 3, an image generated by the detector array 52 is shown. The image generated as shown generally at 80, corresponds to the laser beam hit spot formed by laser beam radiation scattered from the missile target body. As shown, the image of the missile itself is at a threshold level below that of the band pass filter 46, and is therefore not imaged by the detector array 52. The filter is preferably as narrow as possible, depending on laser stability, in order to reduce black body energy arising from hot metal of the missile body. Preferably, the narrow band optical filter is centered on the strongest laser line, if the laser has multiple lines.

It should be appreciated that the arrays 52, 58 are aligned by the alignment system such that a given pixel occupies the same relative position in both arrays, as indicated at 82 in FIG. 3. Corresponding positions are also shown relative to the instantaneous laser beam position on the missile target body indicated at 84.

Likewise, in variant 1 the detector array 58 detects the missile image from radiation having a shorter associated wavelength than the radiation forming the laser beam hit spot. In variant 2, laser wavelengths are blocked by the blocking filter. Thus, as shown in FIG. 3, the laser beam hit spot is not imaged by the detector array 58.

Referring to FIG. 4, the reflected laser beam hit spot again is shown at 80. The target aim point is shown at 88. Tracking electronics process the electrical signal outputs from the arrays 52, 58 to determine a displacement vector 89, that represents the spatial difference between the laser beam hit spot 80 and the target aimpoint 88. Because the arrays 52, 58 are coregistered, the displacement vector 89 can be determined to some fraction of detector element size in common with all arrays. The electronic system thus is capable of directing the laser beam to any position on the missile body under closed loop control, with the tracking electronics algorithm always maintaining the laser beam on the missile midline. Thus, the present invention provides the capability of aiming the laser at any point on the missile, under closed loop control, without the need for detecting a glint off the missile body or other requisite target detection means.

Figure 5:
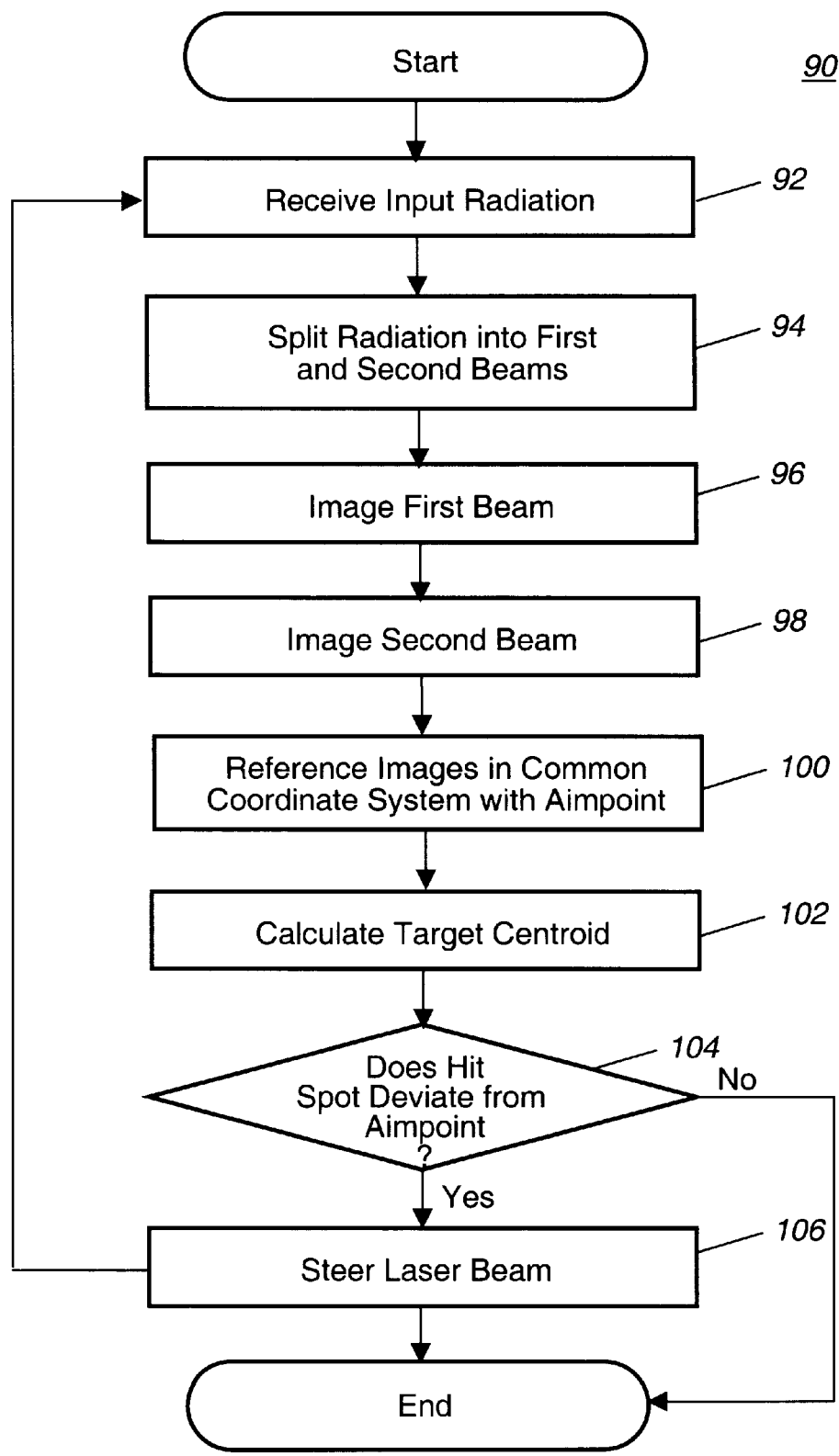
FIG. 5 is a flow diagram illustrating the methodology associated with the operation of the tracker of the present invention.

Referring to FIG. 5, a flow diagram illustrating the methodology associated with the tracker of the present invention is shown at 90. At 92, the tracker receives input radiation. At 94, the tracker beam splitter separates the input radiation into a first beam of laser radiation that is reflected from the missile at the laser beam hit spot, and a second beam of target radiation emanating from the missile body. At 96, the first beam is imaged on the detector array 52, which generates electrical signals corresponding to the detected hit spot. At 98, the second beam is imaged on the detector array 58, which generates electrical signals corresponding to the detected missile body. The co-registration afforded by the alignment assembly ensures that tracking errors due to the separate imaging of the laser hit spot and the missile body are minimized. At 102, the tracker analyzes the imaged hit spot and missile signature through the above-discussed tracking software, and calculates a target centroid. At 104, the tracker determines if the hit spot varies from the desired target aimpoint. If the hit spot does vary from the aimpoint, at 106 the tracker, through its self-referencing servo loop, steers the laser beam to drive the distance between the hit spot and the aimpoint to zero. If the hit spot corresponds to the aimpoint, the methodology ends until the tracker detects a subsequent deviation of the hit spot from the aimpoint.

An alternative embodiment of the invention is illustrated in FIGS. 6 and 7. In this embodiment a shared aperture is used for the outgoing high energy laser and incoming reflected radiation from the target. The shared aperture arrangement takes advantage of the annular central occlusion in the outgoing high energy laser (HEL beam). In particular, a sapphire aperture element is utilized with a pair of co-registered detector arrays. One detector array is used for imaging mid-IR range radiation reflected from the target 16 while the other detector array is used for imaging near IR range radiation from the target. The sapphire shared aperture elements are optically aligned with the short IR range detector thus making it invisible to mid-IR range radiation reflected from the target. Since the coated sapphire window transmits in the near IR range and reflects in the mid IR range, mid-IR range radiation scattered from the target is reflected to the mid-IR range detector. A tilt mirror is used and allows the background radiation to be periodically sampled and subtracted from the mid IR radiation level to improve the signal noise ratio of the system.

Turning to FIG. 6 an illuminating laser, such as the illuminating laser 22 (FIG. 1a), operating in the near IR range, illuminates the target 16 with a series of short pulses creating an electronic timing signal used to control the tracker electronics 32 in order to provide an enhanced image and minimum background interference. In this embodiment, the tracker optics 30 illustrated in FIG. 1a are replaced with the tracker optics illustrated in FIG. 6, and generally identified with the reference numeral 150. The tracker optics system 150 includes a coated sapphire shared aperture element 152 which enables the outgoing high energy laser radiation from the laser weapon 12 (FIG. 1a) and the incoming reflected radiation from the target 16 to utilize the same telescope optics, generally identified with the reference numeral 154. The shared aperture element 152 takes advantage of an annular hole or occlusion region (typically 10% to 25%) that occur in a high-energy laser beam. More particularly, most high-energy lasers are known to employ confocal resonators (not shown). In such a configuration, the laser beam emerges from the resonator in an annular form. The annular laser beam is known to have a hole or occlusion region in the range from about 10% to 25%. The shared aperture element 152 takes advantage of this central occlusion region. In particular, the shared aperture element 152 is provided with a hole 158 that matches the hole in the high-power laser beam to permit mid-IR range radiation scattered from the target 16 to be applied to a mid-IR range detector array 156. The sapphire shared aperture element may be an optically finished turning flat coated with a special very high reflectance coating that makes it an efficient mirror at the laser wavelength, yet allows it transparency at short IR wavelengths.

The tracker optic system 150 also includes a near IR detector array 160 for imaging the target 16. Imaging lenses 162 and 164 are used to image the near IR radiation and mid-IR radiation on the target detector array 160 and mid-IR radiation spot detector array 156, respectively. The focal lengths of the lenses 162 and 164, as well as the dimensions of the detector arrays 156 and 160 are selected so that the arrays 156 and 164 are co-registered. In other words, the target measurement of length z derived from one detector array corresponds with the same measurements in the other array. Moreover, the pixels x, y in one array correspond with the same pixels x, y in the other array.

The sapphire shared aperture element 152 transmits radiation in the near IR range and reflects radiation in the mid-IR range. As such, near IR range radiation reflected from the target 16 is applied to the lens 162 and to the target detector array 160 while mid-IR range radiation reflected from the target reflected to incorporate the laser spot detector array 156 by way of a tilt mirror 165, a filter 166 and the lens 165. The filter 156 is a narrow band filter centered on the mid IR range laser wavelengths such that only reflected mid-IR radiation is imaged onto the detector 156. With such a configuration the sapphire is essentially invisible to the short range IR radiation reflected from the target 16.

The tracker optics system 160 includes a telescope optics system 165. As mentioned above, the telescope optic system 154 is shared by the outgoing high-energy laser radiation from the laser weapon 12 and the incoming reflected radiation from the target 16. In this configuration, the high-energy laser radiation from the laser weapon 12 is applied to the shared aperture element 152 and reflected outward by the telescope optics 154. The hole 158 and the shared aperture element 152 enables the reflected mid-IR range radiation from the target to be directed to the laser spot detector array 156. As shown in FIG. 6 the telescope optic system is illustrated with a lens equivalent Galilean telescope. However, the principles of the present invention are applicable to other telescope optics systems such as a Cassegrain telescope.

Since the telescope optic system 154 is shared for both the outgoing high-energy radiation as well as the incoming reflected radiation, the outgoing radiation is known to have about 60 dB greater power than the returning light causing diffuse scatter which could affect the laser spot detection. In order to resolve this problem, the tilt mirror 165 is provided with a corresponding tilt mirror driver (not shown) which enables the mirror 165 to rotate about one of its axis by a relatively small degree, for example 0.05°. Depending on the instantaneous position of the mirror 165, the laser spot detector array 156 either sees the target or background since the local high power back scatter does not change for such a relatively small angular exertion. With such a configuration, the background can be subtracted on a periodic basis to increase the signal to noise ratio. As such, the tracker electronics 32 are replaced with the tracker electronics system one shown within the box 170.

The laser spot detector array 156 as well as the target detector array 160 are used in part to convert the optical radiation signals to electrical intensity signals. In order to improve the signal to noise ratio of the signal, the tilt mirror 165 may be periodically rotated by a relatively small degree in order to sample the background radiation in order to enable the background signal to be subtracted from the imaged beam hit spot signal. More particularly, the output of the laser spot detector 156 may be amplified by a preamplifier 172 and applied to a synchronous switch 174. The synchronous switch 174 is used to enable the signal plus the background and the background only to be periodically sampled so that the background can be subtracted from the signal plus background signal in order to improve the signal to noise ratio of the imaged beam hit spot. The synchronous switch 174 is driven by the tilt mirror generator 176 which also drives the tilt mirror 165 itself. The synchronous switch 174 may be a single pole double throw switch. In a position as shown in FIG. 7, the synchronous switch is used to sample the signal plus the background. In the opposite position (not shown), the synchronous switch 174 is used to sample the background only.

A pair of sample and hold amplifiers 178 and 180 are attached to the synchronous switch 174. The sample and hold amplifier 178 samples and stores the signal plus the background while the sample and hold amplifier 180 samples and stores the background only. The outputs of the sample and hold amplifiers 178 and 180 are applied to a background subtraction device 182 which may be a summing junction with positive and negative inputs. In particular, the output of the sample and hold amplifier 178 as applied to a positive input of the summing junction 182 while the output of the sample and hold amplifier 180 is applied to a negative input. The output of the summing junction 182 is a signal with an improved signal to noise ratio representative of the laser spot radiation. See generally, the section on gated video trackers and in specific, the section on the Optimality of the Centroid Algorithm in "The Infrared handbook", W. J. Wolfe, E. J. Zissis, Eds., prepared by The Environmental Research institute of Michigan, published by the Office of Naval Research, Washington D.C., 3rd printing, 1989, p. 2271, et seq., hereby incorporated by reference, the laser spot signal 156 is applied to a centroid microprocessor 184 for determining the displacement of the laser spot relative to the centroid of the target 16. This displacement vector represents an error signal which is used to control the high energy laser 12 under closed loop control.

As mentioned above, the mirror IR range detector 160 is used for imaging the target. The detector 160 converts the reflected IR radiation to electrical intensity levels which are amplified by a preamplifier 186 and applied to a sample and hold circuit 188 and in turn to the centroid processor 184. As mentioned before, the distance from the laser spot as represented by the signal at the output of the summing junction 182 is used to generate a displacement factor which is used as an error signal for forming a servo loop relative to the high energy laser. As discussed above, the difference between the high energy laser spot and the centroid is used to create the error signal and a target beam centroid differencer, which is applied to a summing junction 192 along with a desired aimpoint vector. See generally, the section on gated video trackers and in specific, the section on the Optimality of the Centroid Algorithm in "The Infrared Handbook", W. J. Wolfe, E. J. Zissis, Eds., prepared by The Environmental Research Institute of Michigan, published by the Office of Naval Research, Washington D.C., 3rd printing, 1989, p. 22–71, et seq., attached as Appendix A. The desired aimpoint vector is relative to the target outline and may be derived from a library of outlines. A library of target cross sections may be used to support this tracker concept. These library entries may include information about a specific target's most vulnerable spots. For example, a Russian STYX missile has a cable trough running underneath the missile body. If the cable is cut, the missile fails, because it loses all control. It thus is a very "soft" target for a laser weapon. The displacement vector is applied as an error signal to a servo loop which includes a feedback amplifier 194 and a fast steering mirror controller 196 which is used to steer the high energy laser beam 16. The error signal is summed with the desired aimpoint vector to cause the system to drive the mirror controller 196 so as to null the error between the desired and result laser spot on the target 16 under closed loop control.

Upon reading the foregoing description, it should be appreciated that the tracker of the present invention is operative to: (a) acquire and hold a target in its field-of-view and (b) place a laser beam at a desired target location under closed loop control. Thus, the tracker of the present invention now allows the laser weapon to attack a missile or other target at any aspect angle. In addition, the tracker is now insensitive to burning debris and other sources of system distraction, as the tracker images the target at the wavelength of the illumination laser (variant 1) or at the light wavelength passed by the blocking filter (variant 2), and the hit spot at the reflected hit spot radiation wavelength, with all other wavelength being eliminated from consideration. The tracker of the present invention is also a stand alone tracker, and thereby need not work through the same atmospheric tube as the laser beam. The tracker of the present invention is self referencing, and thus measures the instantaneous position of the laser beam relative to the target itself. It is contemplated that the tracker of the present invention could be inexpensively retrofit to present laser weapon trackers.

Various other advantages of the present invention will become apparent to those skilled in the art after having the benefit of studying the foregoing text and drawings, taken in conjunction with the followings claims.

What is claimed is:

1. A target tracker, comprising:
   a laser that generates a first beam of radiation that engages a target to form a beam hit spot thereon;
   a target illuminator that illuminates the target with a second beam of radiation;
   an optics subsystem for receiving reflections of said first and second beams of radiation, said optics subsystem further including two detector arrays said optics subsystem configured to separate the reflections of said first and second beams of radiation and separately imaging the beam hit spot and the target on said detector arrays, said optics subsystem including a shared aperture element for outgoing radiation and incoming radiation from said target; and
   means for steering the first beam of radiation to a desired target aim point in response to information from the imaged beam hit spot and target.

2. The target tracker as recited in claim 1, wherein said shared aperture element is adapted to transmit near IR range radiation.

3. The target tracker as recited in claim 2, wherein said shared aperture element is adapted to reflect mid-IR range radiation.

4. The target tracker as recited in claim 3, wherein said shared aperture element is formed from sapphire.

5. The target tracker as recited in claim 1, wherein said shared aperture element is provided with a hole selected to correspond to an annular occlusion in said first beam of radiation.

6. The target tracker as recited in claim 1, further including controlling means which includes means for improving the signal to noise ratio of said imaged beam hit spot.

7. The target tracker as recited in claim 1, wherein one of said detector arrays is used to image near IR range radiation.

8. The target tracker as recited in claim 7, wherein one of detector arrays is used to image mid IR range radiation.

* * * * *